(12) United States Patent
Oldroyd

(10) Patent No.: US 7,873,240 B2
(45) Date of Patent: Jan. 18, 2011

(54) METHOD FOR ANALYZING GEOGRAPHIC LOCATION AND ELEVATION DATA AND GEOCODING AN IMAGE WITH THE DATA

(75) Inventor: Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 791 days.

(21) Appl. No.: 11/285,248

(22) Filed: Nov. 22, 2005

(65) Prior Publication Data

US 2007/0002040 A1 Jan. 4, 2007

Related U.S. Application Data

(63) Continuation-in-part of application No. 11/174,036, filed on Jul. 1, 2005, now Pat. No. 7,580,591.

(51) Int. Cl.
G06K 9/32 (2006.01)
(52) U.S. Cl. ....................................................... 382/294
(58) Field of Classification Search ................. 382/294, 382/295, 296, 297, 298, 209, 223
See application file for complete search history.

(56) References Cited

U.S. PATENT DOCUMENTS

| 4,635,293 A | 1/1987 | Watanabe |
| 4,970,666 A | 11/1990 | Welsh et al. |
| 4,988,189 A | 1/1991 | Kroupa et al. |
| 5,173,949 A | 12/1992 | Peregrim et al. |
| 5,495,540 A | 2/1996 | Frankot et al. |
| 5,550,937 A | 8/1996 | Bell et al. |
| 5,606,627 A * | 2/1997 | Kuo .......................... 382/154 |
| 5,647,015 A | 7/1997 | Choate et al. |
| 5,995,681 A | 11/1999 | Lee et al. |

(Continued)

FOREIGN PATENT DOCUMENTS

EP 0841537 5/1998

(Continued)

OTHER PUBLICATIONS

Woo, Neider, Davis, Shreiner. "OpenGL Programming Guide," 3rd Ed., Addison Wesley, Inc., 1999, pp. 127-128; p. 674.

(Continued)

*Primary Examiner*—Brian Q Le
*Assistant Examiner*—Edward Park
(74) *Attorney, Agent, or Firm*—Harness, Dickey & Pierce, P.L.C.

(57) ABSTRACT

A method for geographically registering a perspective image of a location assigns elevation values to elements or pixels of a two dimensional array of image elements or pixels of the location. The elevation value for each image pixel is obtained using a corresponding database stored reference digital elevation model, or a three dimensional surface model of the location. The reference elevation model or surface model is composed of rows and columns of elevation values corresponding to two dimensions of location values at a sensed location shown in the image, or is composed of a three dimensional surface or volume model of the location, such as a computer-aided design model or any other means of describing the three dimensional characteristics of the sensed location.

42 Claims, 7 Drawing Sheets

U.S. PATENT DOCUMENTS

| | | | |
|---|---|---|---|
| 6,266,452 B1 | 7/2001 | McGuire | |
| 6,512,857 B1 * | 1/2003 | Hsu et al. | 382/294 |
| 6,694,064 B1 * | 2/2004 | Benkelman | 382/284 |
| 6,738,532 B1 | 5/2004 | Oldroyd | |
| 6,795,590 B1 | 9/2004 | Chen | |
| 2004/0041999 A1 * | 3/2004 | Hogan et al. | 356/141.5 |
| 2005/0147324 A1 | 7/2005 | Kwoh | |
| 2005/0220363 A1 | 10/2005 | Oldroyd | |

FOREIGN PATENT DOCUMENTS

| | | |
|---|---|---|
| WO | WO 99/18732 | 4/1999 |

OTHER PUBLICATIONS

SoftPlotter User's Manual, Vision International, Autometrics, Inc. (now part of The Boeing Company), 1994, pp. 9-1ff.

Digital Point Position Data Base Performance Specification, MIL-PRF-89034, 1999.

Map Projections—A Working Manual, U.S. Geological Survey Paper 1385, 1987, pp. 145-153.

\* cited by examiner

METHOD FOR ANALYZING GEOGRAPHIC LOCATION AND ELEVATION DATA AND GEOCODING AN IMAGE WITH THE DATA

This patent application is a continuation-in-part of application Ser. No. 11/174,036, which was filed on Jul. 1, 2005 now U.S. Pat. No. 7,580,591 and is currently pending. The parent application is assigned to the assignee of this application and is incorporated herein by reference.

BACKGROUND OF THE INVENTION (1) Field of the Invention

The present invention pertains to a method of geocoding a perspective image comprised of a two dimensional array of picture elements or pixels, so that each picture element or pixel of the perspective image has associated with it a unique, three dimensional geographic location in the scene depicted by the perspective image. The three dimensional location at each pixel is obtained using a corresponding database stored reference digital elevation model, or a three dimensional surface model of the location. The reference elevation model or surface model may be composed of rows and columns of height values corresponding to two dimensions of location values in the scene, or it may be composed of a three dimensional surface or volume model of the scene area, such as a computer-aided design model or any other means of describing the three dimensional characteristics of a scene area.

(2) Description of Related Art

Modern military aircraft require a capability to target, from the aircraft cockpit, precision-guided weapons. Many of these weapons require precise, accurate knowledge of the geographic location to which they are to be directed, including three dimensions of information such as latitude, longitude and altitude of the target point. One method to do this is to use sensor images obtained by sensors carried on the aircraft. Such sensors produce a perspective view of the target and the scene area around the target. Typical sensors may also produce a set of geographic coordinates for some marked location in the perspective image, such as the location indicated by a cross-hair or cursor mark in the image. However, making an on-board sensor highly accurate, so that targets can be located within a ground coordinate system with sufficient accuracy using the image produced by the sensor, is difficult and expensive. These problems can be overcome by providing an accurate geocoding for the perspective image produced by the sensor. This geocoding gives each pixel in the sensor image an accurate association with the three dimensional geographic coordinates of the point in the scene depicted in that pixel. When the geocoding is done with sufficient accuracy, it will give sufficient geographic accuracy to direct precision guided weapons against target points selected from the sensor image.

A similar application involves automated guidance of a robot, such as the robot arm of the Space Shuttle or any remote manipulator, or an autonomous mobile vehicle, where a precise goal point or desired location point for motion is identified in a sensor image presenting a perspective view of the scene, but the goal point's precise three dimensional location must be obtained in the scene area imaged by the sensor. Such precise knowledge of location could be used to navigate the robot arm, or an autonomous mobile vehicle, to arrive precisely at the desired goal point. The precise knowledge could also be used to remotely measure locations, distances, shapes, or other two or three dimensional geometric properties in the scene area. If the perspective image is geocoded using an associated three dimensional model of the scene area, such as a computer aided design model, it is possible to determine precisely the desired point location in the scene area, in coordinates of the scene model.

A perspective image of a three dimensional scene presents a two dimensional depiction of that scene as observed from the viewpoint of the sensor. While each pixel in the perspective image depicts the scene content at a single location in the scene area, the projection means discards one dimension of information as it operates, and a two dimensional perspective image does not contain enough information to reconstruct the three dimensional information. Given the projection means, such as a simple frame camera model with parameters describing the camera properties and its location and orientation when the perspective image was collected, it is only possible to associate a line in three dimensions, from any pixel in the perspective scene, projected back through the scene. It is not possible, however, to identify a single, specific point on that line to be identified as the scene location which is depicted in that pixel.

Using an auxiliary three dimensional model of the scene area, it is possible to determine the three dimensional points associated with the pixels in a two dimensional perspective image, although the process has been difficult and slow. By using a three dimensional model of the scene area, it is possible to perform an intersection of each light ray, projected from each pixel in the perspective image, through the camera model, and projecting onwards through the three dimensional model of the scene area. Such ray projection must be performed for each pixel in the perspective image to fully geocode the image. This intersection is an extremely difficult process, as it must account for multiple possible intersections of each ray with the three dimensional elevation model or scene model. For a digital elevation model, a search is conducted along a path through the rows and columns of the digital elevation model, beneath the line of the ray, checking at each row and column location on that path if the ray intersects the elevation model surface at the point above that point on the path. This entails a calculation to determine if the line of the ray projection passes the geographic location associated with that row and column in the digital elevation model at an altitude sufficiently close to the elevation given at that row and column location in the digital elevation model. By using a search that extends in direction from the sensor location and towards the scene, the first intersection of the ray with the scene area elevation model surface indicates the closest visible location in the scene area. The three dimensional location at the closest point is the location to be associated with the scene element depicted in that pixel. There may be thousands of points along a single ray that need to be tested for intersection, and a ray search is needed for each pixel in the perspective image to be geocoded.

For a three dimensional surface model, such as a facet model used in computer graphics representations of three dimensional scenes, an intersection must be determined between the ray and all surface facets in the model. The facet which intersects the ray at the closest distance from the sensor location along the ray, and which is visible from the point of view of the sensor, gives the three dimensional location to associate with the corresponding perspective image pixel. A typical facet model may contain millions of facets, so the search with each ray for facet intersections is very expensive. A similar difficulty occurs with a volume model of the scene, and the volume model may first have to be reduced to a collection of surface facets which are then treated as a facet model of the scene area.

The OpenGL projection model (for example the "Woo 99" model disclosed in "Open GL Programming Guide, $3^{rd}$ Ed.,"

Woo, Mason; J. Neider; T. David; D. Shreiner; Addison Wesley, Boston 1999) contains a simple means to associate three dimensional location information for a scene area, with a two dimensional image projection of that area, but can only be applied when the OpenGL projection model is employed. Many projection operators, including that in OpenGL, actually transform three dimensional coordinates into three dimensional coordinates, with two of the resulting coordinates immediately useful as row and column pixel locations in the perspective image. The third result coordinate, typically called the Z coordinate, is discarded in constructing a perspective image. However, implementations of OpenGL retain the Z coordinate for each projected pixel of the perspective image, and allow an inverse projection function, called "unproject", that calculates from the two dimensional projected pixel location in the perspective image, making use of the third or Z coordinate value retained for that pixel location, to produce an approximation of the three dimensional location from which the projection to that perspective pixel was obtained.

This projection method, which operates to produce for each projected location a corresponding three dimensional scene location requires that OpenGL be used to produce the projected image. The projected image is not geocoded by this means. However, if the reference elevation model used to provide the three dimensional data from which the projection is constructed is geocoded, then the unproject means can provide a geocoding for the perspective image.

The OpenGL projection model is computationally demanding. It operates by transforming three dimensional coordinates from the scene area model into two dimensional, perspective image, projection coordinates, with the hidden but retained Z coordinate. The OpenGL projection assumes a facet model of the scene area, and performs visibility checks and ray intersection for each facet in the scene area model. Each facet is separately processed. Facets are checked for visibility by examining their bounding corner points, and the orientation of their visible face. Facets not visible by location, or by orientation away from the viewing location, are skipped. All facets which are at least partly visible are processed. This leads to a requirement for a major computational effort, normally provided by implementing OpenGL in a specialized hardware graphics adaptor.

The processing maps each three dimensional coordinate at the corners of the visible part of a facet into the perspective image, defining a two dimensional facet in the perspective projection space to be filled with the picture contents assigned to the scene model facet. A Z-buffer technique is used, whereby each pixel can only be assigned to a part of the facet picture content if its Z value is smaller than any previously saved Z value for that pixel location. If a pixel passes the Z value test, its value is assigned to the facet pixel, which is also assigned the Z value for that part of the facet providing the pixel value. Since small Z values represent portions of the scene closer to the sensor, occluded surfaces will be occluded by being overwritten with pixels which are given content from a facet producing a closer, smaller Z value, or by not being written because the closer pixel was written into the image first.

There are many applications where use of the OpenGL projection model, or an OpenGL hardware graphics accelerator, or even an OpenGL software simulation are not possible, or not desirable. Applications that require small computers, such as a wearable computer, or computers in specialized environments, such as in fighter aircraft equipment bays or on Space Shuttle robot arms, are particular examples where a standard graphics capability may not be feasible to implement. Electrical power requirements may prevent use of a graphics adaptor, because of their usually large power and heat demands, arising from the high-speed processors they employ.

SUMMARY OF THE INVENTION

The present invention provides a method of producing a geocoding for a two dimensional image presenting a perspective view of a scene area, without requiring specialized computing hardware, while allowing the use of complex sensor model software for particular types of sensors (for example FLIR and SAR), that can compute and correct for geometric distortions particular to the specific types of sensors. The examples of particular geometric distortions would include lens distortions from a FLIR sensor, or layover and foreshortening distortions of a SAR sensor.

The problem solved by the invention is the generation of a geocoding for a perspective image that faithfully associates pixels in the perspective image with the scene locations being viewed, taking into account both the viewing perspective and the characteristic image geometry of a particular sensor, without requiring the use of specialized hardware and without the computational difficulty inherent in existing geocoding methods. The invention generates a geocoding in a forward-mapping manner, and solves the problem of hidden surfaces within the scene elevation model in a simple way that provides sufficient speed and adequate quality and accuracy, enabling standard reference elevation data base sources to be used for geocoding sensor images from all perspectives or points of view, by producing an array of geocoordinates, one for each pixel in the perspective image, that accurately represent the corresponding three dimensional locations in the scene being projected to perspective pixels. It also solves the assured assignment problem by using a novel backfilling process to ensure each pixel location in the perspective image is given an appropriate three dimensional geocoding value to represent the corresponding location in the scene area from which it came.

The present invention provides a method of generating a geocoding for a perspective image of a location as a computer storage array of rows and columns of three geographic coordinate values each, representing three dimensions of location, where each row and column location in the array corresponds to a single row and column location of a pixel in the perspective image. The geographic coordinate values are obtained from a digital elevation model or DEM of the scene area, or from a computer-aided design three dimensional model of the scene area, or from any other means of depicting three dimensional information about a scene area. The generated geocoding is constructed to geometrically match the perspective image of the location, so that it faithfully corresponds to the scene geometry as depicted in the perspective image. The method is described herein as being used in military aircraft to generate a geocoding of a perspective image of a target area. However, the method also has other applications, for example, in directing the movements of a robot around obstacles at a given location, or in directing the movements of a mechanical arm in a particular location, or in numerous other applications requiring a sensor image to be accurately geocoded to a three dimensional reference model, in which precise information as to the relative positions of the sensor and scene is known, and the three dimensional, elevation or scene model reference has an accurate geocoding or association to a scene model coordinate system, or has a known and accurate mathematical relationship to the same scene model coordinate system.

The method first involves having a perspective image of a location being observed. This image may be obtained by directing an image sensor, for example a FLIR sensor or SAR sensor, having a line of sight so that the line of sight intersects with the particular location desired to be viewed. The image sensor produces the perspective image of the location around the line of sight, and it is to this image that the invention herein is applied.

Reference elevation information for the location is then obtained. The elevation information is obtained from any of a variety of available sources of the information, for example digital elevation model (DEM) information available from the United States Geological Survey (USGS) or the National Emergency Management Association (NEMA). The elevation information obtained is then associated with geographic coordinates of the scene area.

The reference elevation array consists of a plurality of rows and columns of elevation measurements, said measurements sometimes called posts. It has associated with each entry a two dimensional coordinate location, according to the entry's row and column position in the array. The two dimensional coordinate may consist of 2 numeric values stored in additional computer storage locations associated with the element, or it may be implicitly represented by a pair of computational formulae that associate the row and column numbers of the entry with the corresponding two dimensional coordinates. An example of this latter method, when the two dimensional coordinates represent longitude and latitude on a terrestrial plane, is to have each row of the reference elevation array associated with a single latitude, and each column of the reference elevation array associated with a single longitude, and the longitudes and latitudes associated so that successive rows from first to last represent successively more southernly latitudes, and successive columns from first to last in the first row of elements represent successively more eastern longitudes, and the successive longitude and latitude values increase in an orderly manner, such as by a constant increment. In this manner, each reference elevation array element is implicitly associated with a given latitude and given longitude corresponding with its row and column location in the array. More complex associations are easily described, wherein the row and column locations fall on a grid at some rotation to the usual geographic grid, or on a grid there the location values represent discrete steps of distance, such as meters, rather than discrete steps of latitude or longitude angle. Associations based on any cartographic projection model may be used, also, with the only requirement being that a method to uniquely associate two dimensional locations in the scene to row and column locations in the reference elevation array must exist.

Each entry in the reference elevation array contains a value which represents the third coordinate value in the scene, at the point whose location is given by the two dimensional coordinate associated with the row and column position of that element in the array. In the examples above using geographic location for the associated two dimensional scene coordinate, the height or geographic elevation at that geographic location in the scene could be taken as the value to be stored in that element of the reference elevation array. For an arbitrary three dimensional scene reference model, such as a computer-aided design model, the value in the reference elevation array element would be a third coordinate of a point in the model that corresponds to a point seen in the perspective image, such as a corner of a visible object. In this manner, each element of the reference elevation array may be said to be a three dimensional geocoordinate value, consisting of the two dimensional coordinates represented by its row and column location in the array, and the third coordinate value contained in the element itself. This terminology will be used in the following discussions.

The reference elevation array is then oriented so that the reference elevation array orientation corresponds to the orientation of the perspective image line of sight to the desired location. This gives the reference elevation array the same orientation as the perspective image relative to the imaged scene. It may help to visualize these orientations as an observer would see them, holding the array of elevation posts up to view as if it were an array of pixels similar to the array of pixels constituting the perspective image, and holding the array of pixels up in a similar fashion, thus giving a sense of top and bottom to both arrays. For example, if the perspective image depicts nearby portions of the scene towards the bottom of the image, the described orientation of the reference may then be said to place the reference elevation array so that entries at the bottom of the reference elevation array correspond to scene locations closer to the sensor location, and pixels at the top of the reference elevation array correspond to scene locations farther from the sensor location.

Each of the reference elevation array entries are then mapped to locations in the computer storage array for perspective geocoordinate values, with each reference elevation array entry mapped according to the 2 scene coordinates associated with the elevation array entry's row and column position, and the third coordinate stored in that array entry, using a standard coordinate projection transform, known in existing art. A front row or bottom row of the reference elevation array is mapped into a front line or bottom line of the geocoordinate array, with the 2 scene coordinates for each reference elevation array element and the third coordinate stored in the reference elevation array element taken as a geocoordinate value as described above, and assigned to the mapped perspective geocoordinate array element. The line or sequence of locations in the perspective geocoordinate array mapped from a row of locations in the reference elevation array will follow a path through the perspective geocoordinate array that depends on the elevations stored in the elements of that row in the reference elevation array. Successive rows of the reference elevation array, upwardly across the reference elevation array are then mapped to successive lines of the perspective geocoordinate array, upwardly across the perspective geocoordinate array.

The placement of successive lines in the perspective geocoordinate array depends on the elevations associated with the geocoordinate values of the successive rows of the reference elevation array as they are mapped to the perspective geocoordinate array. Depending on those elevations, a sequence of mapped perspective geocoordinate array elements may cross behind a previously mapped sequence, indicating that low elevations mapped from the current row of reference elevation array elements are obscured by higher elevations closer to the sensor, from a previously mapped row of reference elevation array elements, and resulting in some geocoordinate values in the succeeding line of the perspective geocoordinate array not being retained. Alternatively, the lines of geocoordinate elements mapped in the perspective geocoordinate array may come closer together or spread farther apart, indicating differing changes in elevations across successive rows of geocoordinate elements in the reference elevation array. The top or back row of the reference elevation array is last mapped to a top or back line of the perspective geocoordinate array completing the perspective geocoordinate mapping.

Each of the perspective geocoordinate elements so mapped by a reference elevation array element is assigned the geocoordinate value of the corresponding reference elevation array element. This assigned geocoordinate value gives the three dimensional scene location corresponding to that element location in the perspective geocoordinate array. Since there is an exact correspondence between pixels in the perspective image array, and elements in the perspective geocoordinate array, the geocoordinate at each array element also gives the scene location from which the corresponding pixel seen in the perspective image was imaged. By this means, a three dimensional location in the scene can be associated with any object or location observed in the perspective image.

It is typical that, in using a forward perspective transform, not all of the perspective geocoordinate array elements will be mapped with a reference elevation array element. Unmapped perspective geocoordinate array elements in the rows and columns of the perspective geocoordinate array are identified each time a reference elevation array element is mapped into a perspective geocoordinate array element. Any unmapped perspective geocoordinate array elements in the column below the mapped perspective geocoordinate array element are then backfilled with the geocoordinate value of the mapped perspective geocoordinate array element above them in the column. In addition, unmapped perspective geocoordinate array elements in a row having adjacent mapped or backfilled perspective geocoordinate array elements in the same row on opposite sides of the unmapped perspective geocoordinate array element are backfilled with an interpolation of the geocoordinate value of the adjacent mapped perspective geocoordinate array elements. The novel backfilling of the perspective geocoordinate array elements fills (as needed) the unassigned geocoordinate array elements in the perspective geocoordinate array, resulting in a complete geocoding for the perspective image of the sensed location.

If the perspective image is also rotated about the sensor line of sight, the perspective geocoordinate array so completed is now rotated using standard image rotation means to conform to the rotation known for the sensor image. If the geocoordinate array is stored as 3 separate arrays, one for each of the 3 coordinate values, then 3 separate image rotations should be applied. If the geocoordinate array is stored with some form of data compression or data coding, it may be rotated in its coded form, if the coding permits a nearest neighbor resampling during rotation to preserve sufficient accuracy, or it may be necessary to decode the compressed or coded form into 3 separate coordinate arrays, to rotate each separately, and recombine them afterwards into a compressed or coded form.

BRIEF DESCRIPTION OF THE DRAWINGS

Further features of the present invention are revealed in the following detailed description of the preferred embodiment of the invention and in the drawing figures wherein.

DESCRIPTION OF THE PREFERRED EMBODIMENT

In a preferred embodiment, the invention provides a method of generating a perspective geocoordinate array for a location from a reference elevation array of the location, where the generated perspective geocoordinate array is recorded as a numerical array of electronically stored values for additional processing, or for storage in a computer file for later use. The description of the method to follow is made with reference to its use in a military aircraft, where the method generates a perspective geocoordinate array for a geographic target area. However, it should be understood that the method of the invention has many different applications, for example, for generating a perspective model coordinate array for a location to be used by a robot to enable movement of the robot around obstacles at the given location. In another example, the method of the invention may be employed in generating a perspective scene coordinate array of a location where a remotely-operated mechanical arm is located to enable movement of the mechanical arm around obstacles at the particular location. In yet another embodiment, the method of the invention may be employed to generate a perspective measurement coordinate array of an object where precise measurements must be made of points around that object, by making those measurements in a perspective image of that object, and then using the precise registration of the perspective image to the perspective measurement array of the object to achieve the measurements.

Figure 1:
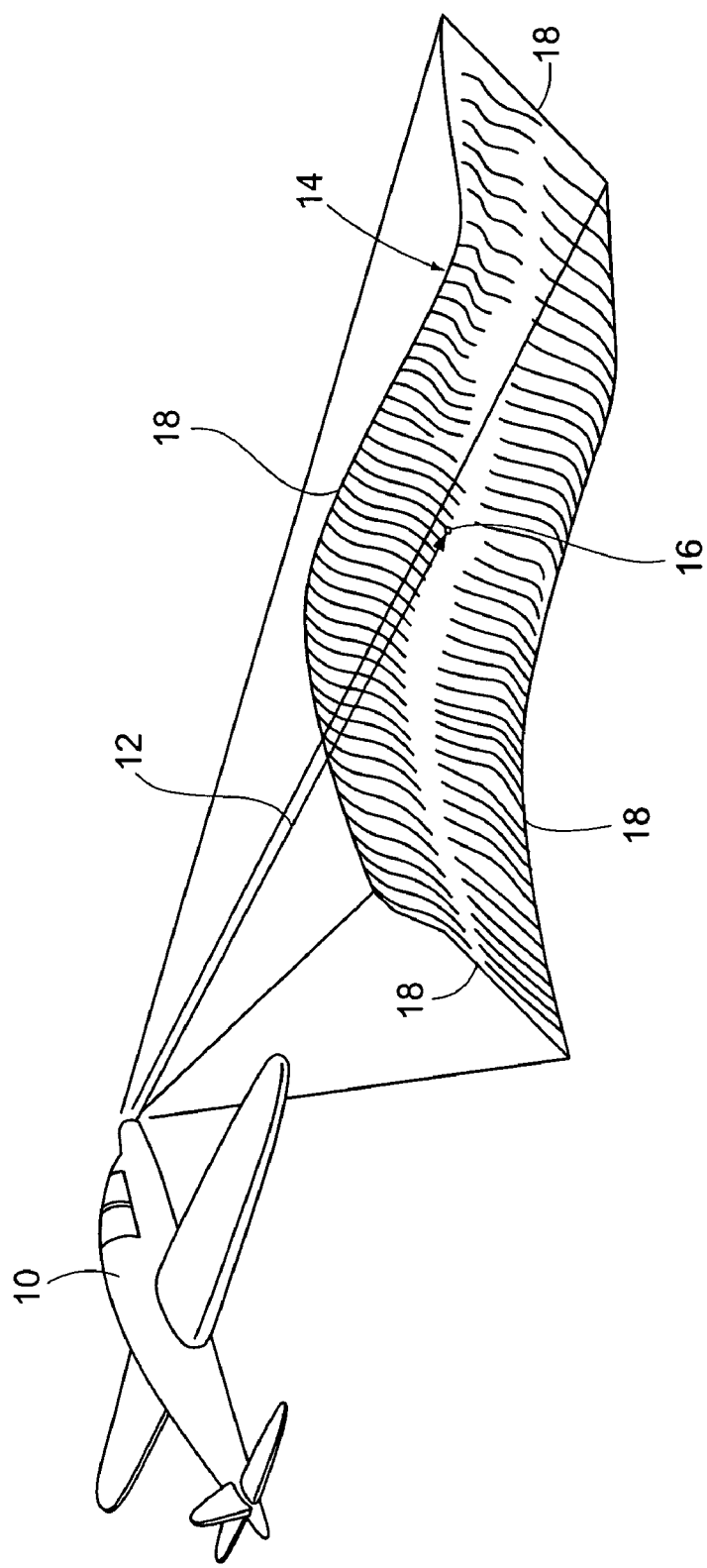
FIG. 1 is a representation of a motive source, i.e., an aircraft, having an image sensor that is directed along a line of sight that intersects with a location, in the example shown a geographic location, to produce a perspective image of the location, along with supporting data that accurately describe the sensor position and orientation and other sensing parameters when the perspective image was captured, and the location at which the line of sight intersects the scene area.
Figure 6:
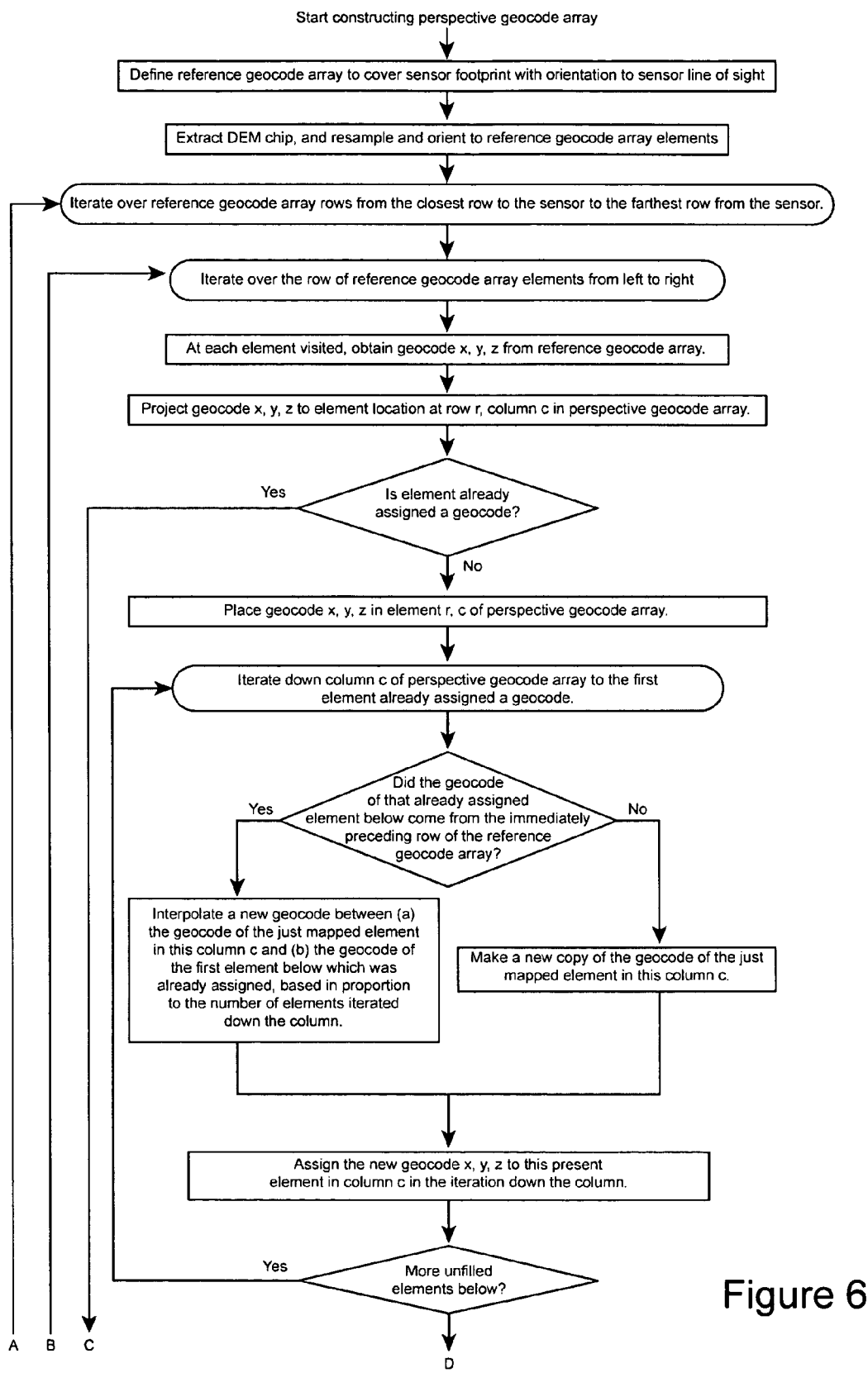
Figure 7:
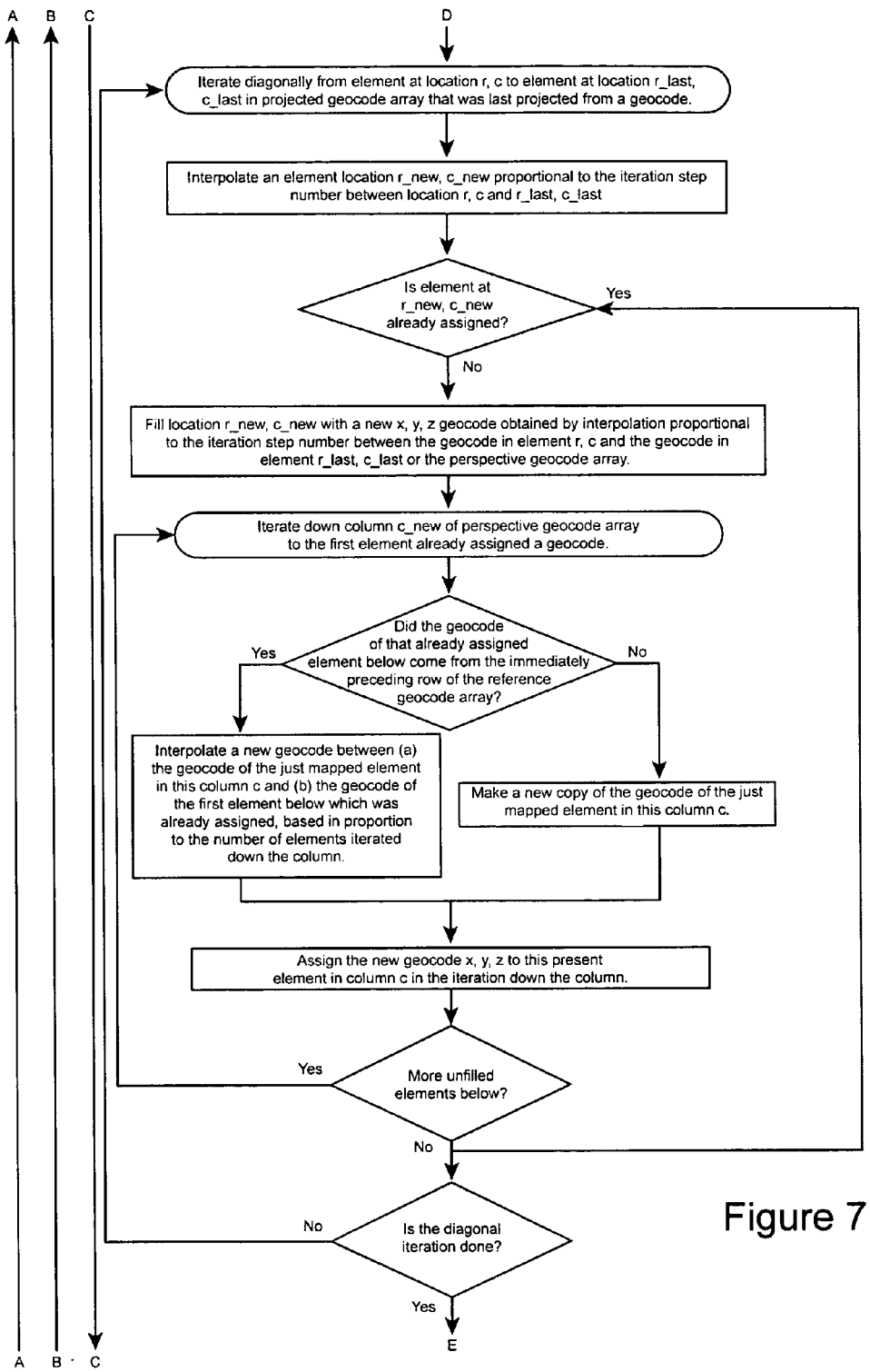
Figure 8:
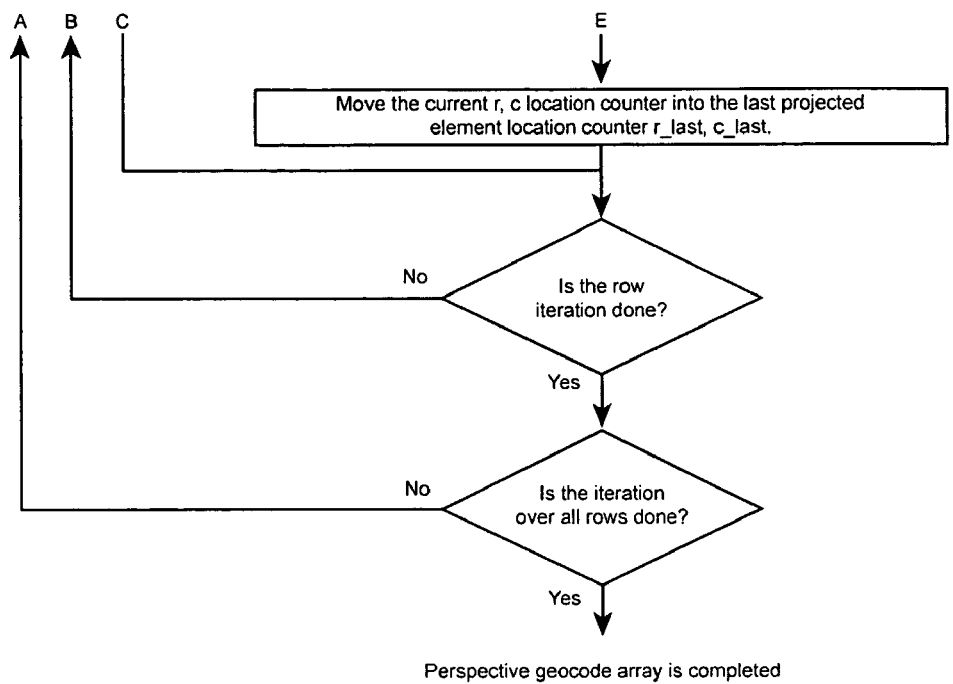

FIG. 1 shows a representation of an aircraft 10 that is equipped with a forward-looking sensor such as a forward-looking infrared (FLIR) sensor or a synthetic aperture radar (SAR) sensor. The drawing figure depicts the aircraft sensor having a line of sight 12 that is directed to a geographic area 14 and intersects with the terrain of the geographic area 14 at a particular point 16. Known sensors of this type are capable of sensing the contours of the land and/or objects within predefined boundaries of the geographic area or location 14 represented by the perimeter edge 18 shown in FIG. 1. The sensor provides signals to the electronics of the aircraft 10 that produce a visual display (not shown) and recorded array (not shown) of the sensed image of the location 14 around the line of sight 16 within the sensed image boundaries 18. This visual display and the recorded array are a perspective image which depicts the land and objects in the scene around the point 16 being viewed by the sensor. The viewing conditions, such as aircraft 10 location and orientation, and line of sight 12 direction, and location of the particular point 16 within the geographic area 14, and properties of the sensor, such as field of view and any image formation characteristics peculiar to the sensor, are expected to be known, in order that the perspective geocoordinate array for that perspective image can be constructed as this invention describes. The method of the construction is depicted in the flow chart of FIGS. 6-8.

In one embodiment, the method of this invention is also provided with a database that includes reference elevation arrays of several geographic areas or locations, including a reference elevation array of the geographic area or location 14 that is depicted in the perspective image. A typical reference elevation array database contains a geographically registered elevation array that depicts elevation or height information for the geographic area, in the form of a digital elevation model (DEM).

Each reference elevation array typically consists of a DEM with a plurality of rows and columns of elevation measures over a geographic area or location, where the row and column indices of the array have been put into mathematical correspondence with a geographic coordinate system for the area, such as the World Geodetic System 1984, or WGS84. The correspondence is such that each array element's location in a row and column of the digital image may be associated with a specific geographic coordinate, such as latitude and longitude in the geographic coordinate system. The correspondence operates in reverse, also, so that any geographic coordinate may be associated with an element's row and column location in the reference image. Since many geographic locations will not be exactly the same as those that are in direct correspondence to array element row and column location, it is usually necessary to force the reverse correspondence to select a single array element location, such as by rounding the reverse correspondence computed array element location to the nearest row and column index values. On occasion, it is desirable to allow the reverse correspondence to denote fractional array element locations, that is, locations that are numerically in between array element exact row and column indices, for purposes such as resampling the elevation array to produce a higher resolution DEM, rotating the DEM to a new orientation, or warping the DEM array to present a different geometric form, such as an orthographic projection.

The mathematical relationship of elevation array element row and column locations to a geographic system is normally much more coarse for the DEM than for a perspective image, due to differences in the corresponding geographic spacing of the pixels and elevation measurements in the elevation array. For example, pixels in a perspective image will usually have small corresponding geographic spacing, perhaps representing a ground resolution of 3.5 meters or less ground spacing between pixels, for images originating with a SPOT satellite reference image. DEM elevation array elements, on the other hand, are normally more widely spaced in corresponding ground coordinates, such as 30 meter spacing for a United States Geodetic Service Level II DEM.

The elevation measurements in the reference elevation array are then resampled by approximation, to increase or decrease the spacing of measurements to best correspond to the estimated ground coordinate spacing of pixels in the perspective image. The estimated ground spacing is obtained by standard geometrical calculation, based on a known range from sensor to scene, known characteristics of the sensor such as width of field of view and the incremental width of field of view for a single sensing element or pixel in the sensor, and known sensor resolution at the center of the perspective image. Resolution is measured across the direction of the line of sight as it falls on the ground to obtain best accuracy. Resampling is performed by establishing a grid of points covering the scene area as an array of geographic locations, with columns of points in the array running parallel to the line of sight of the sensor when projected on a plane of constant height running through the scene, and rows of points in the array running perpendicular to the line of sight of the sensor when projected on a plane of constant height running through the scene. Each of these points is given a known two dimensional geographic coordinate, according to its position in a row and column of the array, using the mathematical correspondence similar to that for a DEM to relate row and column indices to geographic coordinates, except that the rows and columns are aligned with the perspective image sensor line of sight, rather than with North for the typical DEM. At each of the established grid points, an elevation measurement is approximated, by interpolation using a standard interpolation resampling means. At each established grid point, the row and column indices of that grid point are used to determine corresponding geographic coordinate location for that grid point. The reversed correspondence of the DEM is then used to determine a fraction index location in the DEM. The interpolation is then done using a weighting means, based on distance from the fraction array location corresponding to the grid point to the four or more mutually adjacent posts in the DEM. Some grid points of the resampled reference elevation array may require interpolating between only two elevation values of adjacent reference elevation array elements. Fewer still correspond exactly to individual elevation elements. Such resampling is done by standard means, known in the art. The latitude, longitude, and elevation information for each resampled reference elevation array element is given to an appropriate accuracy. The accuracy figure may be retained, for use in estimating accuracy in positional calculations to be carried out in applications using the perspective image. As stated earlier, DEM information is available from sources such as the United States Geological Surveys (USGS) or the National Emergency Management Association (NEMA), as well as other, Government or commercial sources.

To produce the desired perspective geocoordinate array of the geographic area depicted in the perspective image, a region of interest is first selected from the reference elevation array. Typically, the region of interest is a rectangular sub-array of rows and columns from the DEM, with sub-array rows chosen to all have the same extent and to encompass all the across line of sight extent of the depicted geographic area, and with sub-array columns chosen to all have the same extent and to encompass all the along line of sight extent of the depicted geographic area. The rows and columns of the sub-array are aligned with the rows and columns of the DEM, respectively, and the sub-array surrounds the known location of the center of the sensor image view, or the location of the intersection 16 of the sensor image line of sight 12 with the geographic area 14. The location of the intersection 16 of the sensor image line of sight 12 with the geographic area 14 should be known precisely, in order that the geocoding of the perspective image be accurate, so that geocoordinates associated with each different pixel in the perspective image will accurately represent the geocoordinates of the point in the scene depicted in each of those pixels. In some applications, this precise knowledge might be obtained by constructing a synthetic perspective image at the same time as the geocoding is constructed, so that both represent the same common perspective. The synthetic perspective image could be constructed by the method disclosed in my copending patent application Ser. No. 11/174,036, which is incorporated herein by reference.

Figure 2:
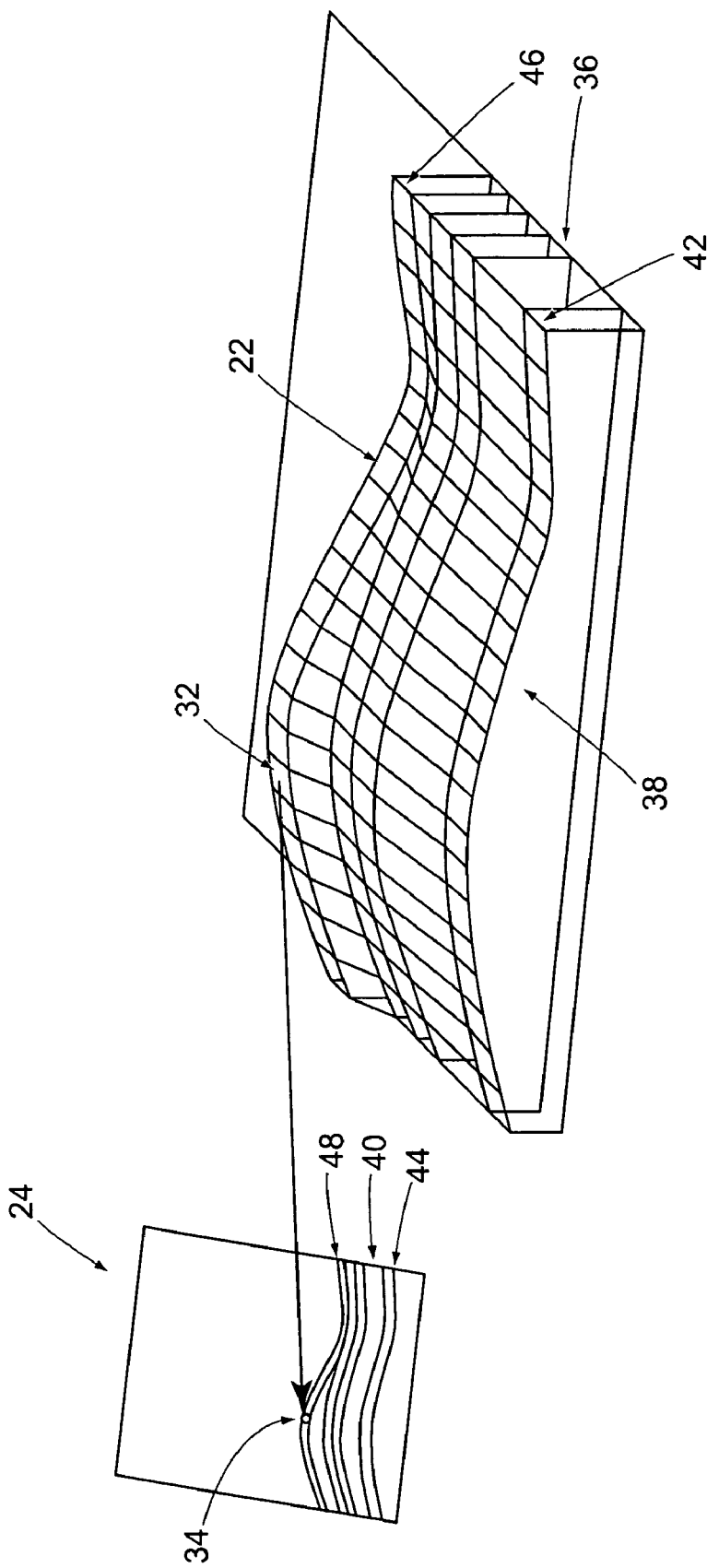
FIG. 2 is a representation of the method of mapping geocoordinate locations of a reference elevation array of the sensed location to a perspective geocoordinate array for the perspective image that was previously captured.
Figure 3:
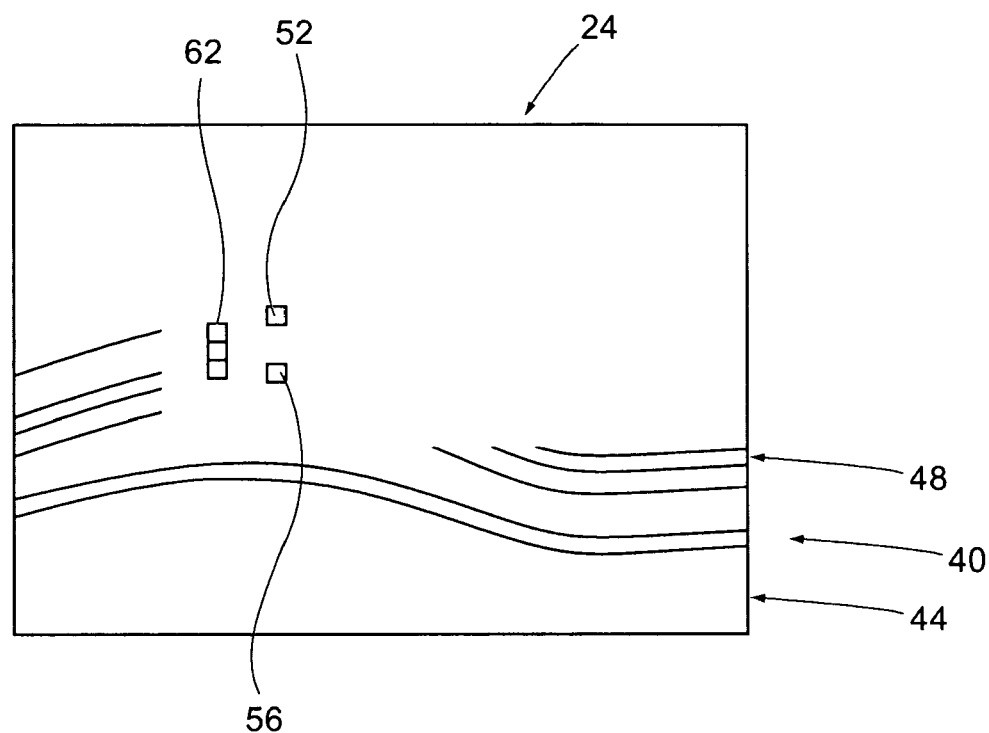
FIG. 3 is a representation of the generation of the perspective geocoordinate array elements.

The region of interest of the reference elevation array is then rotated to the previously known azimuth of the perspective image view. This results in the reference elevation array elements being oriented so that the reference elevation array orientation corresponds to the orientation of the geographic area 14 relative to the perspective image sensor line of sight 12. This orientation of the reference image 22 is represented in FIG. 2. This places the reference elevation array 22 such that array rows 36 at the bottom of the reference elevation array 22 correspond to scene locations closer to the sensor location from which the perspective image was obtained, and thus closer to the image plane 24 for the perspective image. In the preferred embodiment, the reference elevation array is oriented so that it is in alignment within less than 1.5 degrees relative to the orientation of the geographic area 14 as depicted in the perspective image for the aircraft image sensor line of sight 12. In orienting the reference elevation array, latitude and longitude position information of the aircraft image sensor which obtained the perspective image, as well as altitude information, compass heading information, and pitch and yaw information for the aircraft image sensor are used to adjust the orientation of the reference elevation array 22. The reference elevation array 22 is cropped or reduced in size prior to being oriented, so that only the portion of the reference elevation array needed is oriented and to reduce the computational work load.

The reference elevation array 22 may also be resampled prior to being oriented, to a ground sample resolution or geographic spacing on the ground that better matches the ground sample resolution of the perspective image, in order to further reduce the computation work load, in the case of sampling to lower resolution, or to improve the fidelity of the synthetic perspective image, in the case of sampling to higher resolution. In a preferred embodiment, the reference elevation array 22 would be resampled to the ground sample resolution of the center pixel in the perspective image, measured along the row direction or along the direction of a line in a horizontal plane of the sensed scene perpendicular to the sensor line of sight 12 if the sensor image is rotated about the line of sight. The measured ground sample resolution of the perspective image may alternatively be taken as the smaller of the ground sample resolutions along the center row or along the center column of the sensor image.

In a preferred embodiment, the order and nature of cropping the reference elevation array, resampling the reference elevation array, and rotating the reference elevation array to the orientation of the perspective image sensor line of sight 12 is adjusted to minimize the amount of elevation information to process. Resampling may be done first, if it reduces the number of elevation array elements that must be processed. Some cropping of the reference elevation array before its rotation is usually desirable, to eliminate processing array elements in the reference elevation array which will represent locations not visible in the perspective image, and hence need not be included in the rotation of the reference elevation array. A second cropping of the reference elevation array following its rotation is also possible, to reduce the computational burden of unneeded array element processing in generating the perspective image geocoding.

Once the region of interest from the reference image 22 is rotated to the proper alignment as depicted in FIG. 2, it is then processed into the perspective geocoordinate array 24.

The perspective geocoordinate array 24 is generated in a forward-mapping procedure which solves the hidden surface problem in a way that provides sufficient speed and adequate quality in generating the perspective geocoordinate array from standard reference elevation arrays that are selected corresponding to the sensor parameters of the aircraft 10 or other sensor that obtained the perspective image.

Briefly, the perspective geocoordinate array 24 is generated by mapping the cropped and oriented reference elevation array 22 into the perspective geocoordinate array 24. The reference elevation array 22 is mapped to the perspective geocoordinate array 24 from foreground to background of the location area 14, or from the bottom of the elevation array to the top of the elevation array, row by row, and within rows, element-by-element, using the surface elevation measurement associated with each row and column index of the reference elevation array 22 in order to properly map array elements into locations in bottom to top order. This ordering is crucial to ensuring that foreground objects at higher elevations obscure background objects at lower elevations in the generated perspective geocoordinate array 24. As reference elevation array elements are mapped to perspective geocoordinate array elements, a geocoordinate value consisting of the X and Y geocoordinate values associated with the row and column indices of the reference elevation array element location in the reference elevation array, together with the elevation or Z value stored in that element of the reference elevation array, are stored as the geocoordinate value in the mapped element in the perspective geocoordinate array. The generated perspective elevation array element values are blurred downward and to the sides in the perspective geocoordinate array 24, to provide complete filling of the generated perspective geocoordinate array elements, and assure assignment of values to all elements in the perspective geocoordinate array.

FIG. 2 represents the manner in which the reference elevation array 22 is processed or used to generate the perspective geocoordinate array 24 by mapping each element 32 of the reference elevation array 22 individually into an element 34 in the perspective geocoordinate array 24. This is accomplished by using a standard projection coordinate transform known in the art for mapping locations from a three-dimensional scene into a two-dimensional image plane, and which corresponds accurately with the projection means that formed the perspective image. FIG. 2 shows the rows 36 and columns 38 of the reference elevation array elements in the three-dimensional reference elevation array where each element of the reference elevation array retains a Z-component for the height or elevation value associated with the reference elevation array element. The row and column indices of the array element 32 are assigned X-component and Y-component values to complete the three-dimensional geocoordinate. The X-component and Y-component values are obtained using the correspondence to geocoordinates for row and column indices from the resampled reference elevation array. The information provided by the resampled elevation array is used as the Z-component in the perspective image transformation, so that the perspective geocoordinate array 24 is given an accurate rendering of the perspective geometry of the geographic area or location 14. The particular standard transformation employed in generating the perspective geocoordinate array 24 may be modified, or an additional transformation included, to adjust for sensor-specific geometric distortions that occur in the perspective image. These modifications that accommodate for known distortions in particular types of sensors are known in the art.

A front row or bottom row 42 of the reference elevation array elements is first mapped into a front line or bottom line 44 of the perspective geocoordinate array element with the geocoordinate value associated with each reference elevation array element being assigned to the mapped perspective geocoordinate array element. The line of elements 44 in the perspective geocoordinate array 24 mapped from a row of elements 42 in the reference elevation array 22 will follow a path through the perspective geocoordinate array 24 that depends on the elevations stored in the elements in the row of elements 42 in the reference elevation array 22. Successive rows 36 of the reference elevation array elements extending upwardly across the reference elevation array 22 are then mapped to successive lines 40 of perspective geocoordinate array elements upwardly across the perspective geocoordinate array 24. The placement in row and column locations of successive lines 40 of the perspective geocoordinate array elements depends on the elevation measurements in the elements in the successive rows of reference elevation array elements 36 mapped to each line 40 of perspective geocoordinate array elements. Depending on those elevations, a line 40 of perspective geocoordinate array elements may cross a previously mapped line, indicating low elevations mapped from the current row 36 of reference elevation array elements are obscured by higher elevations closer to the perspective image sensor, mapped from a previously mapped row of reference elevation array elements, and resulting in some elements 34 in the succeeding line of the perspective geocoordinate array 24 not being retained. Alternatively, the lines 40 of elements in the perspective geocoordinate array 24 may come closer together or spread farther apart, indicating differing changes in elevations between the rows 36 of elements in the reference elevation array 22. The top or back row 46 of the reference elevation array elements is last mapped to a top or back line 48 of the perspective geocoordinate array elements, completing the generation of the perspective geocoordinate array 24 of the sensed location depicted in the perspective image.

If the perspective image is rotated about the sensor line of sight 12, the perspective geocoordinate array so completed is now rotated using standard image rotation means to conform to the rotation known for the perspective image.

In one embodiment, a novel aspect of the invention is the complete filling of the geocoordinate array space in the perspective geocoordinate array 24. A forward transform, as used here in mapping the individual reference elevation array elements 32 from the reference elevation array 22 to perspective geocoordinate array elements 34 of the perspective geocoordinate array 24, will typically not completely fill the perspective geocoordinate array 24. This means some perspective geocoordinate array elements 34 will not be mapped with a reference elevation array element 32. Completing the perspective geocoordinate array by filling in unmapped geocoordinate elements is an important step in creating a useful perspective geocoordinate array.

In one embodiment, the novel method employed with the invention, to determine values for perspective geocoordinate array elements whose values were not determined by the direct projection or mapping from the three-dimensional reference elevation array elements, requires processing the reference elevation array elements 32 by rows 36, from the closest or bottommost reference elevation array row 42 successively across the reference elevation array to the farthest or top reference elevation array row 46. As each reference elevation array row 36 is processed, it is known thereby that all closer rows of the reference elevation array elements have already been processed. Hence, if a reference elevation array element 32 is projected into an array location in the perspective geocoordinate array 24 that has already been assigned or mapped a reference elevation array element value, it is known that the reference elevation array element being mapped is occluded or hidden from view from the viewpoint of the perspective image sensor of the aircraft 10 and cannot be seen in the perspective image 24, and should not be represented in the perspective geocoordinate array, so that reference elevation array element is processed no further. If a reference elevation array element 32 is projected into an element location in the perspective geocoordinate array 24 that has not been previously assigned a value, then the reference elevation array element is visible and its value is assigned to the perspective geocoordinate array element 34 into which it is projected.

Figure 4:
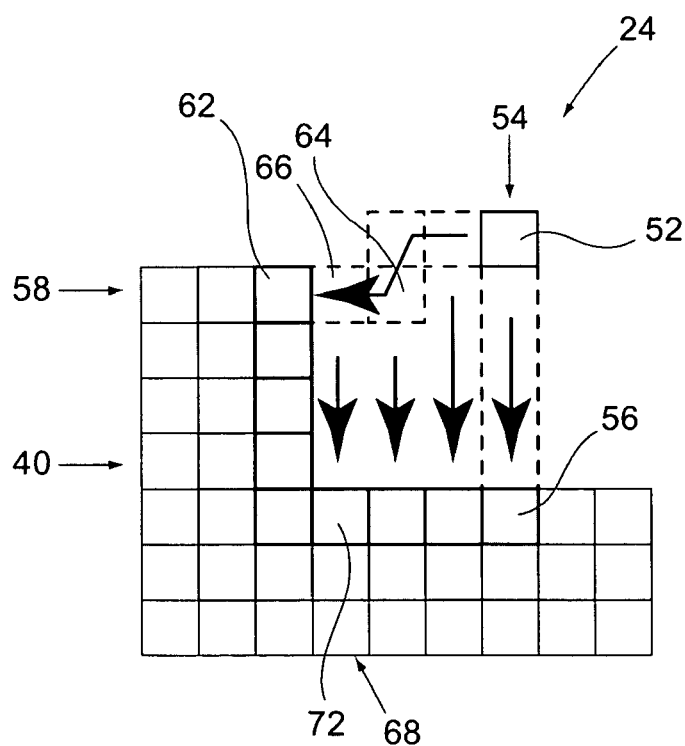
FIGS. 4 and 5 are representations of the backfilling of the perspective geocoordinate array elements; and, FIGS. 6-8 show a flow chart of the method for geocoding a perspective image.

Still further, as depicted in FIG. 4, the geocoordinate value assigned to the mapped perspective geocoordinate array element 52 is used to assign a geocoordinate value to any perspective geocoordinate array element in the column 54 below the mapped perspective geocoordinate array element 52, which has not previously been mapped by a reference elevation array element and not previously been assigned a geocoordinate value. It is important that the backfill be done for each row as the row is projected, and as each element is projected, else some later projected element be mapped into an unfilled element that would have been filled if the filling had been done as each element was initially mapped. The purpose behind this backfilling technique is to ensure that no elements of the perspective geocoordinate array lacking an assigned geocoordinate value will be left surrounded by pixels having assigned geocoordinate values in the completed perspective geocoordinate array. Any elements in the perspective geocoordinate array 24 that are below the mapped perspective geocoordinate array element 52 and that have not been previously mapped, come from or correspond to closer locations in the reference scene area. Hence, if the perspective geocoordinate array elements in the column 54 below the mapped perspective geocoordinate array element 52 have not been assigned geocoordinate values, those lower, unassigned elements of the column 54 should be given the geocoordinate value of closer elements from the reference elevation array. However, all of the closer reference elevation array elements 32 from the reference elevation array 22 have already been mapped to elements 56 in the perspective geocoordinate array 24 due to the successive order of mapping the reference elevation array rows 36 from front to back or from bottom to top. Therefore, any remaining, unassigned elements in that column 54 and beneath the mapped perspective geocoordinate array element 52 in the perspective geocoordinate array 24 are determined to be related to that presently mapped perspective geocoordinate array element 52. The geocoordinate values assigned to the lower perspective geocoordinate array elements in the column 54 are copied from the mapped element 52, when it is known that the last (or uppermost) assigned perspective geocoordinate element 56 below the presently mapped perspective geocoordinate array element 52 in that column came from other than the next closest row of elements in the reference elevation array 22.

Alternatively, if the last (or uppermost) assigned perspective geocoordinate element 56 below the presently mapped perspective geocoordinate element 52 in a column 54 came from the next closest row of pixels in the reference elevation array, the geocoordinate values assigned to perspective geocoordinate array elements in that column 54 below the presently mapped perspective geocoordinate array element 52 and above the last (or uppermost) assigned perspective geocoordinate array element 56 should be determined by interpolating between the geocoordinate value of the last (or uppermost) assigned perspective geocoordinate array element 56 and the geocoordinate value of the presently mapped perspective geocoordinate array element 52, using an interpolation means such as linear interpolation.

Successive reference elevation array elements 32 from a given row 36 of the reference elevation array also may or may not map onto perspective geocoordinate array elements 34 in successive columns 54 in the perspective geocoordinate array as shown in FIG. 4. This will typically occur if the reference elevation array 22 has a lower spatial resolution when projected to the perspective geocoordinate array 24, than the perspective image of the projected area 24 presents, as may be the case in the foreground or lower areas of the perspective geocoordinate array 24. This is another aspect of the lack of mapped coverage in the perspective geocoordinate array 24 that may arise in the projection of reference elevation array elements 32 from the reference elevation array 22 to the perspective geocoordinate array 24. The novel method to complete mapped coverage in this situation provided by the invention is to interpolate spatially to the sides, to neighboring columns 54, that is, to interpolate unmapped perspective geocoordinate array elements in a row 58 of the perspective geocoordinate array between the two successively mapped geocoordinate array elements 62, 64 across the columns of the perspective geocoordinate array, and to treat the intermediate interpolated perspective geocoordinate array elements 66 as individually mapped elements. Hence, for each intermediate interpolated perspective geocoordinate array element 66, its assigned geocoordinate value is copied or interpolated down its column 68 to the last (or uppermost) perspective geocoordinate array element 72 below it which was previously assigned a geocoordinate value, as if element 66 had actually been mapped from the reference elevation array 22.

The spatial interpolation between the current 64 and preceding 62 mapped perspective geocoordinate array elements can be accomplished by any reasonable interpolation means, such as the Brezenham blind interpolation algorithm, a known prior art algorithm, and may proceed in any order, such as from the current perspective geocoordinate array element 64 to a preceding mapped perspective geocoordinate array element 62, or the reverse. It is pointed out that it is important to realize that the present perspective geocoordinate array element 64 and the preceding mapped perspective geocoordinate array element 62 may have different row and column positions, or either or both could be the same, so that the interpolation may not be a simple sequencing along a row or column, but will generally sequence on an angular, stepped path through the perspective geocoordinate array as shown in FIG. 4 for interpolation from a currently mapped element 52 of the perspective geocoordinate array 24 to the last preceding currently mapped element 62, both of which came from the same row 36 of elements in the reference elevation array, and from adjacent elements in that row. Intermediate mapped perspective geocoordinate array elements 66 so interpolated in this line of elements in the perspective geocoordinate array should be assigned interpolated geocoordinate values determined proportionally and separately for each X, Y and Z component of the geocoordinate values, from the current mapped element 54 to the last preceding currently mapped element 62, or in the reverse direction, for best accuracy, where the geocoordinate value interpolation means may be an extension of the location interpolation means, or a separate interpolation means. When assigned a geocoordinate value, these elements 52 through 62 should be treated each as a mapped element, and any unmapped elements in the columns 54 beneath them in the perspective geocoordinate array should be back filled in the manner described above.

Figure 5:
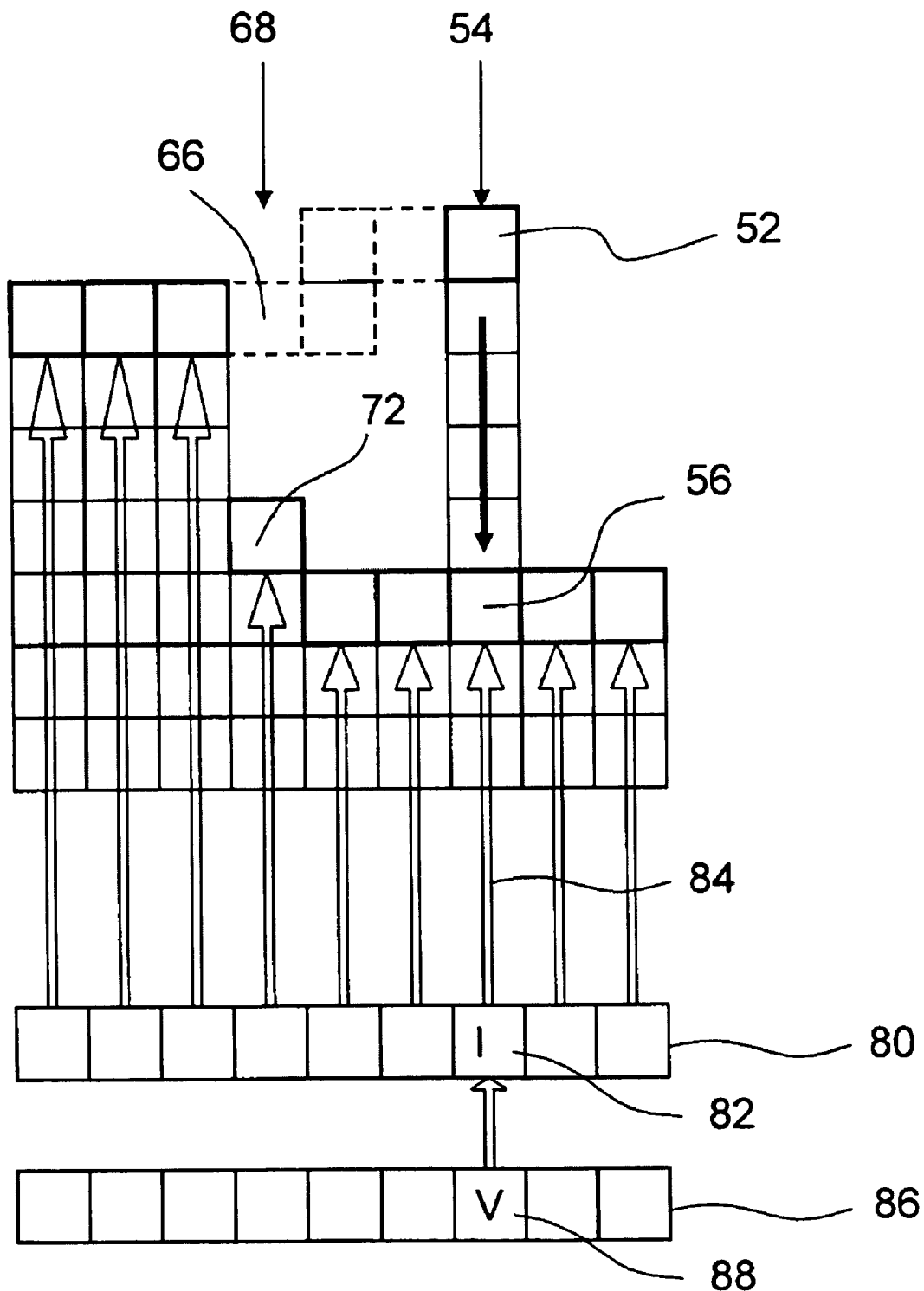

In another embodiment, another novel aspect of the invention, depicted in FIG. 5, gives increased efficiency of interpolation down a column of perspective geocoordinate array elements 54 from the currently mapped perspective geocoordinate array element 52 to the last previously mapped perspective geocoordinate array element 56 in that column 54. It utilizes a row index array 80 of row index values 82, one for each column of elements 54 in the perspective geocoordinate array, to indicate 84 where in the column 54 the last previously mapped perspective geocoordinate array element was mapped, and thus to also indicate how far down it is necessary to interpolate in that column. The row index value I in the row index array location 82 corresponding to a column 54 is the row index of the last previously mapped or horizontally interpolated element 56 in that column. A similar geocoordinate value array 86 of geocoordinate values X, Y and Z shown as V 88 is used to hold corresponding geocoordinate values of the last previously mapped perspective geocoordinate array element 56 for each column 54. Interpolation down a column 54 of perspective geocoordinate array elements can then be easily done without checking if elements have been assigned a geocoordinate value, as the interpolation proceeds from the row position of the currently mapped element 52 to the row position above the row indexed 82 in the row index array 80 for that column 54 containing the last previously mapped element 56. This use of the row index array also eliminates any need to interpret one geocoordinate value as a sentinel value, to indicate when no value has yet been assigned to a geocoordinate value storage element, allowing fullest use of element values to hold geocoordinate values, which could be encoded or compressed more readily in the absence of a need for a sentinel value. Interpolation is then done using the geocoordinate value of the currently mapped element 52 and, when appropriate, the geocoordinate value 88 obtained from the geocoordinate value array 86 of the last mapped element 56 in that column 54, according to the previously described interpolation means. Following interpolation in the column 54, the row index value for the currently mapped perspective geocoordinate array element 52 is copied into the row index array location 82 corresponding to that column 54 of perspective geocoordinate array, replacing the value that was there, and the geocoordinate value of the currently mapped perspective geocoordinate array element 52 is copied into the geocoordinate value array location 88 corresponding to that column 54 of perspective geocoordinate array, replacing the value that was there.

Reviewing some of the principle features of the invention, there are basically two separate geocode arrays involved, one "parallel" to the image array and one covering the sensed scene. The projection of the image operates to map a geocode from the sensed scene to a pixel location, and then the geocode from the sensed scene is copied into the "parallel" geocode array at the row and column location of the pixel to which it was mapped. Thus each pixel receives a corresponding geocode to indicate what point in the scene the pixel portrays.

The geocodes may be represented in more than one way, and usually, the two geocode arrays involved will represent the geocodes differently. The "geocode" could also include non-geographic, 3-D coordinate systems.

The location geocode array normally has a simple relation to a planar orthogonal coordinate system. This might be geographic longitude and latitude, or it might be meters North and meters East in a UTM map coordinate system, or it might be meters units in two orthogonal coordinate axes of a model coordinate system for the scene. The axes don't actually have to be orthogonal; however orthogonal axes makes the coordinate transforms easier.

A simple relation may be a set of two linear transforms (scale and offset) that transform one row or column coordinate of the array into one of the location coordinates. For example, row coordinates (row index values) might transform into latitude values, and column coordinates (column index values) might transform into longitude values. Or, the row and column index pair might transform into a pair of longitude and latitude values, under a two dimensional linear transform. Such simple transforms are invertible, so the location geocode value can be transformed (by the inverse transform) into corresponding row and column indices. When transforming to row and column indices, it is usually necessary to round the transform values to obtain integer index values.

The third geocode coordinate falls on a coordinate axis that is usually orthogonal to both of the other two axes, such as the way altitude is related to longitude and latitude. Thus, the location geocode array is best presented as an array of third coordinate values only (e.g. altitude values) where the row and column array coordinates (indices) have a simple relation to the first two location coordinate values. In this manner, each location geocode value is represented at a location in the array by (i) the row and column position in the array, which directly relates to the planar two dimensional position, and (ii) the value stored at that position in the array, the third coordinate. In geographic terms, the row and column index of a geocode value in the location geocode array represent longitude and latitude coordinates, and the value stored is the elevation coordinate.

For the image geocode array, the situation is different. It may or may not be feasible to use the row and column indices of those image geocode values to simply translate into two of the three location geocode values. For example, a projection transform is used to map a three dimensional location geocode (longitude, latitude, altitude) to a two dimensional (row and column) pixel location in the image. This row and column location is the same as for the image geocode value for that pixel, but the inverse of a projective transform can not produce three coordinates from only two coordinates, it requires the use of all three image geocode coordinates.

The inverse projection may be performed using the row index and column index values, and a value at that row and column location, if the proper value is stored at that location. What the proper value is depends on the type of projection, and may involve a more difficult computation to determine the location geocode that was originally mapped to that image geocode location. This particularly becomes a difficulty under the backfill method of the invention.

In a preferred embodiment, a simpler, approach is to simply record the complete location geocode coordinate set of three values in the image geocode location mapped when the location geocode coordinates were projected to the image array. An equivalent approach is to record the location geocode row and column array index coordinates, and the third location coordinate. The row and column index coordinates usually require less computer storage, making this method more efficient in use of storage. Of course, it is necessary to keep the simple row and column index coordinate association available, for use in recovering geocode values associated with image pixels. The backfill process still works, as long as the interpolation process is linear.

The image geocode value is clearly a location geocode. The value in a location geocode array element is an altitude value, while the position of that value in the array represents the other two coordinates of the location geocode. It is necessary to distinguish the two different arrays of geocodes, because the projection maps location geocodes to image pixel locations, and the location geocode is stored into that image pixel's associated image geocode.

The nature of backfilling and sidemapping is that they must be done incrementally, as each new location geocode is mapped to an image pixel.

The mapping order is important. The mapping of geographic coordinates to pixels must operate to first map the row of geocoordinates that are closest to the sensor's geographic location when the image was obtained, then successive rows of geocoordinates that each fall farther than the last from the sensor's location, and finally the row of geocoordinates that are farthest from the sensor's geographic location.

The reference array of geocodes (that is, of geographic coordinates, or the elevation values in the array for which the row and column addresses in the array are associated with longitude and latitude coordinates of the area around the location seen in the image) is rotated to achieve this particular orientation, that is, so there will be a row of geographic coordinates closest to the sensor's location, and the direction of that row will be perpendicular to the direction of the sensor's line of sight. This orientation is important, as it makes the projection come out right.

The mapping of rows of geocodes to the image pixel array is then to lines of pixels in the image that are not necessarily rows of pixels nor necessarily straight lines. Only in general will those lines proceed from the bottom of the image to the top. With variation in the elevation values, the lines of pixels so mapped can be wavy. They will, however, not have loops, because the elevation in the location area can not have overhangs. (Such might exist in nature, but the geographic information will only show the highest part of an overhang.)

Essentially, the order of mapping has only an incidental relation to pixel locations, but is fully dependent on the location geocode order.

In a preferred embodiment of the present invention, the elements of the method are outlined as follows:

Perspective Image of Scene
   image of a scene
   known perspective relation of camera
      XYZ location of scene center in scene coordinates
      location of camera in scene coordinates
      orientation of camera in scene coordinates
      any alternative means of representing the same relationship
   properties of camera (any complete set of information)
      field of view
      focal length
      dimensions of pixel array (# of columns, # of rows)
      spacing of pixels
      any alternative means of representing the same camera information
   array of pixels depicting scene in perspective
      known perspective
      known camera properties
      arranged in columns and rows
      center of scene portrayed in center pixel of image
   corresponding array of elements to record scene coordinates associated with pixels
      one element for each pixel
      arranged in columns and rows, like pixels Construct a Perspective Geocode Array of Scene Coordinates
   each element of the array is associate with a single pixel in the perspective image
   each pixel in the perspective image may be associated with one or more elements of the array
   multiple pixels in the perspective image may be associated with a single element
   associate coordinates of one scene location with each element of the array
   coordinate associated with a pixel is of a location in the portion of the scene depicted in pixel
   coordinate associated with a pixel could be closest, farthest, or average location in the portion of the scene depicted in the pixel [the method below associates the closest location, but slight changes would associate farthest or average]
   record coordinates of that scene location in the associated element for later use Construct a Reference Geocode Array of Scene Coordinates Capturing the Scene Geometry
   known model of the scene area
   known scene coordinate system X,Y,Z
   array of Z values of locations in scene columns and rows have assigned X,Y coordinate values, respectively
  Z value in each array element corresponds to scene model Z value for X,Y coordinates corresponding to element column and row position
Z coordinate value is necessary
X,Y coordinate values may be directly represented as values stored with Z value
X,Y coordinate values may be indirectly represented by mathematical formulae providing translation from column, row locations to appropriate X,Y coordinate values
  one set of formulae serves entire array
    linear combination of scaled row and column coordinates is common
    any suitable formulae can be used
array sized to cover all or most of scene area depicted in the perspective image
  limitation may be needed to keep array size within practical limitations of available array storage space or processing time
center element of array represents center location of the scene Rotate and Resample the Reference Geocode Array
  rotate elements in the array to align with camera line of sight
    alignment relative to scene model coordinates associated with array columns and rows
  elements of the center column of rotated array fall in the direction of the camera line of sight as it would be drawn in the scene using scene model coordinates
  rotated array has bottom row nearest to sensor, top row farthest from sensor, in scene model coordinates
  resample the elements in the scene coordinate array to have the same scene model spacing as do pixels in the center of the perspective image
    use standard resampling art
  more or fewer rows and more or fewer columns may be needed, depending on the resampling increasing or decreasing the spacing of array element scene coordinates.

Project Reference Geocode Array Elements to the Perspective Image
  use known projection and known camera properties
  exclude from the projection any known rotation around the camera line of sight
  project each X,Y,Z element in the reference geocode array to a C,R column and row location in perspective geocode array
  record, at location C,R in the perspective geocode array, the X,Y,Z scene model coordinates that projected to location C,R
  project elements by rows from nearest row to farthest row from sensor
  in a row, project elements from a first side to a last side
  fill each C,R element with X,Y,Z scene model coordinate that projected to it
    fill only if that C,R element was not previously filled with a scene model coordinate
    fill with a Z coordinate value is necessary
    fill with X,Y coordinate values is done if those values cannot be recovered using the inverse projection
  backfill in perspective geocode array after each X,Y,Z element is projected
    fill down column from present projected [mapped] element
      fill to last projected element previously filled
      fill using copy or interpolation
    fill across columns in perspective geocode array
      fill from presently projected element
      fill to last C,R element projected from the preceding element from the same row of the reference geocode array
      fill an element only if it has not been previously filled
      fill using interpolation of X,Y,Z scene model coordinates that were projected
      if an unfilled element is filled, backfill down the column under it using copy or interpolation
    guide backfill using a control array with an entry triple for each column of the perspective image
      use three entries for the last element projected and filled in that column
        row index in reference geocode array of the element last projected to the column
        row index of the perspective geocode row to which it was projected
        the scene model coordinate value X,Y,Z that was projected
      reference geocode row index entry records the row index in reference geocode array of the last element that projected into that column
      perspective geocode row index entry records the perspective geocode row into which the last projection and fill was made in that column
      geocode value entry records XYZ scene model coordinate value of the last element that projected and filled into that column
    backfill down the column uses interpolation or copy of XYZ scene model coordinate values
      use interpolation when the previous projection and fill into that column was from the previous row of the reference geocode array
      use copy when the previous projection and fill into that column was not from the previous row of the reference geocode array
      filling in the column is down from the presently projected row to the row above the recorded projected geocode row index
      interpolation in the column is by standard means over the extent to be filled and between the XYZ scene model coordinate value projected and the XYZ scene model coordinate value recorded for that column
      the control values are replace with the new values used in the column backfill, when the backfill is completed Rotate the Elements in the Perspective Geocode Array to Match the Rotation of the Perspective Image
  rotate the elements around the center of the array
  match the rotation of the perspective image around its line of sight
  use standard rotation means
  use standard resample means on the scene model coordinates Although the method of the invention has been described above by reference to a specific example, it should be understood that modifications and variations may be made to the method without departing from the intended scope of protection provided by the following claims.

The invention claimed is:
1. A method of geocoding an image of a location, the method comprising:

directing an image sensor having a line of sight so that the line of sight intersects with a location and the image sensor senses the location;

using the image sensor to generate a sensed image in a two dimensional array of image pixels of the location sensed by the image sensor, the two dimensional array formed by a plurality of rows and columns of said image pixels;

using one or more data storage sources to obtain geographic information pertaining to the location;

wherein said using one or more data storage sources comprises obtaining latitude and longitude values from a two dimensional array and elevation data from an elevation data source for each said image pixel forming the sensed image; and using said two dimensional array and the elevation data to form a two dimensional first array of location geocode values;

using a processor to process the image pixels of the sensed image and the two dimensional first array of location geocode values to associate the geographic information with the image pixels of the location, the processing including:

orienting the two dimensional first array of location geocode values relative to the image sensor line of sight; and rotating the location geocode values to achieve a desired alignment of the location geocode values relative to the image sensor line of sight.

2. The method of claim 1, further comprising:
the two dimensional array of image pixels having rows and columns of image pixels;
the two dimensional first array of geocode values having rows and columns of geocode values; and
associating in the first association the geocode values with the image pixels of the location by mapping each geocode value to an image pixel from a bottom row of image pixels upwardly through successive rows of image pixels to a top row of image pixels.

3. The method of claim 2, further comprising:
mapping each geocode value to an image pixel from a first side column of image pixels to an opposite second side column of image pixels for each row of image pixels.

4. The method of claim 3, further comprising:
mapping the geocode values to the image pixels in the first association using a projection coordinate transform.

5. The method of claim 1, further comprising:
mapping each said geocode from a bottom row of the two dimensional first array of geocodes through successive rows of the two dimensional first array of geocodes across the two dimensional first array of geocodes to a top row of the two dimensional first array geocodes, to a respective bottom row of the image pixels through successive rows of the image pixels across the image pixel array to a top row of the image pixels.

6. The method of claim 5, further comprising:
backfilling unmapped image pixels in a column that have not been mapped by a geocode with an interpolation of a geocode of a mapped image pixel in a successive row of image pixels and in the same column of the unmapped image pixel.

7. The method of claim 1, further comprising:
obtaining latitude and longitude information, altitude information, compass heading information, and pitch and yaw information for the image sensor as the image sensor senses the location; and
using the information to obtain the geographic information for the location.

8. The method of claim 1, further comprising:
each said elevation value in a column and row position of the two dimensional array of elevation values and the associated geographic longitude and latitude for that column and row defining a location geocode value in the two dimensional first array of location geocode values;
each elevation value in a location geocode corresponds to the elevation value at the geographic longitude and latitude coordinates in the location sensed by the image sensor for the location geocode value; and
the longitude and latitude coordinates of the first array of location geocodes are a two dimensional grid of locations around the location sensed by the image sensor.

9. The method of claim 8, further comprising:
wherein the orienting the two dimensional first array of location geocode values includes orienting the two dimensional first array of location geocode values for the location so that the orientation of the two dimensional first array of location geocode values corresponds to the orientation of the image sensor line of sight relative to the location.

10. The method of claim 9, wherein said rotating the location geocode values comprises:
rotating the location geocode values around a center row location in a center column in the two dimensional first array of location geocode values;
rotating to an angle that aligns the center column of the two dimensional first array of location geocode values with a longitude and latitude extent of the sensor line of sight relative to the location; and
the alignment placing location geocode values closest to the sensor in the bottom row of the oriented two dimensional first array of location geocode values.

11. The method of claim 10, further comprising:
the bottom row of the rotated location geocode values in the first array of location geocodes being the row of location geocode values having geographic longitude and latitude coordinates closest to the sensor location; and
the top row of the rotated location geocode values in the first array of location geocodes being the row of location geocode values having geographic longitude and latitude coordinates farthest from the sensor location.

12. The method of claim 10, further comprising:
rotating the location geocode values includes establishing a new association for the columns and rows of the two dimensional first array of rotated location geocode values with geographic longitude and latitude locations;
the new association of longitude and latitude locations of the two dimensional first array of rotated location geocode values being a rotated grid of geographic longitude and latitude locations in the area around the location sensed by the image sensor; and
the central column of the grid of geographic longitude and latitude locations falls on a line along the sensor line of sight at the location.

13. The method of claim 1, further comprising:
associating geographic information with image pixels of the location in said first association includes a two dimensional array of image pixels and a two dimensional second array of image geocode values; and
each image pixel of the two dimensional array of image pixels is associated in a second association with one and only one image geocode value of the two dimensional second array of image geocode values.

14. The method of claim 13, further comprising:
the two dimensional array of image pixels having rows and columns of image pixels;

the two dimensional second array of image geocode values having rows and columns of image geocode values; and the row and column location of an image pixel in the two dimensional array of image pixels being the same row and column location of its associated image geocode value in the two dimensional second array of image geocode values according to said second association.

15. The method of claim 14, further comprising:

an image geocode value consisting of three coordinate values of geographic longitude, latitude and elevation.

16. The method of claim 13, further comprising:

placing a copy of a projected geocode value into the associated column and row location of the two dimensional second array of image geocodes according to said second association;

placing said copy only if said associated column and row location of the two dimensional second array of image geocodes has not previously had a copy of any geocode placed in it; and the associated row and column location in the two dimensional second array of image geocodes having the same row and column location according to said second association as the image pixel location mapped by projecting the location geocode value.

17. The method of claim 13, further comprising:

obtaining the geographic information in a two dimensional first array of rows and columns of location geocode values of longitude, latitude and elevation information for the location;

a second array of image geocode values having rows and columns of the geocode values for the associated image pixels according to said second association;

mapping each location geocode value from a bottom row of the location geocode values through successive rows of the location geocode values across the first array of location geocode values to a top row of the location geocode values, to a respective bottom line of the image pixels through successive lines of the image pixels across the image pixel array to a top line of the image pixels; and the lines of the image pixels mapped from rows of the location geocode values are determined by a projection transformation using the geocode values in each geocode value row of the first array of location geocodes.

18. The method of claim 17, further comprising:

backfilling unmapped image pixels in a column that have not been mapped by a geocode value;

backfilling with a copy or an interpolation of a geocode value of a mapped image pixel in a previously mapped row of image pixels and in the same column of the unmapped image pixel; and causing backfilling to be performed immediately after the mapping of a geocode value is performed.

19. The method of claim 18, further comprising:

backfilling unmapped image pixels in a column includes image pixel row locations in the column at and below the presently mapped image pixel location, and above the last mapped image pixel location in the same column.

20. The method of claim 18, further comprising:

unmapped image pixels includes image pixels not having previously had any location geocode value projected into the column and row location of the image pixel; and unfilled image pixels includes image pixels not having previously had any geocode value placed into the image geocode value for the image pixel location.

21. The method of claim 18, further comprising:

copying the geocode value presently being mapped into an unmapped location in the column when the image geocode value of the last mapped image pixel is not a geocode value of the immediately preceding row of geocode values of the geocode array; and or interpolating a geocode value into unmapped locations in the column when the image geocode value of the last mapped image pixel is a geocode value of the immediately preceding row of geocode values of the geocode array.

22. The method of claim 21, further comprising:

interpolating a geocode value in the column includes interpolating between the geocode value being presently mapped to the column and the geocode value last mapped into the column; and interpolation is in proportion to the row location being interpolated in the column between the row locations mapped by the present and last mapped geocode values.

23. The method of claim 18, further comprising:

sidemapping unfilled image pixels in adjoining columns includes interpolating image pixel row and column locations in the two dimensional image pixel array from the presently mapped image pixel row and column location to the image pixel row and column location mapped by the immediately preceding geocode value from the same row in the two dimensional first array of location geocode values;

interpolating associated geocode values proportionally between the geocode value of the presently mapped image pixel and the geocode value of the immediately preceding mapped image pixel; and backfilling in the column below each interpolated image pixel which has not had a geocode value assigned to the column.

24. The method of claim 23, further comprising:

interpolating image pixel row and column locations includes obtaining a new row location in each successive column;

the new row location of the image pixel being interpolated is in the same proportion between the row position of the image pixel presently mapped and the row position of the immediately preceding mapped image pixel as the column position is in proportion between the column position of the image pixel location presently mapped and the column position of the immediately preceding mapped image pixel; and the new row location is rounded to be an integer row location.

25. The method of claim 18, further comprising:

an array of last location geocode row index values to retain the row index value in the location geocode array of the location geocode value last mapped to the image pixel array in a column;

an array of last location geocode values to retain the location geocode value last mapped to the image pixel array in a column;

an array of last image geocode row index values to retain the row index value in the image pixel array of the image pixel location last mapped by a location geocode value in a column; and each array having one value each for each column of the two dimensional image pixel array.

26. The method of claim 18, further comprising:

copy or interpolation down the backfill column is from the presently mapped image pixel row down to the row above the last image geocode row index value in the last image geocode row index array for that column;

copy of the currently mapped location geocode value into image geocode locations in the column occurs if the location geocode value being presently mapped is from a row of the two dimensional location geocode array that is not adjacent to the row index in the array of last location geocode row index values for that column;

interpolation of the currently mapped location geocode value into image geocode locations in the column occurs if the location geocode value being presently mapped is from a row of the two dimensional location geocode array that is adjacent to the row index in the array of last location geocode row index values for that column; and interpolation into image geocode locations in the column is proportional between the location geocode value being presently mapped into the image pixel array and the location geocode value in the array of last location geocode values for that column.

27. The method of claim 26, further comprising:

backfill of image geocode locations in a column includes recording into the last location geocode row index array entry for this column the row index value in the location geocode array of the location geocode presently being mapped into this column;

recording into the last location geocode value array entry for this column the location geocode value of the location geocode presently being mapped into this column;

recording into the last image geocode row index array entry for this column the row index value in the image pixel array of the image pixel to which the presently mapped location geocode is being mapped; and causing the recording to occur immediately after the backfill in the column is completed for the presently mapped location geocode.

28. The method of claim 17, further comprising:

sidemapping unfilled image pixels in adjoining columns by backfilling at interpolated image pixels from a just backfilled column to a last previously backfilled column of image pixels; and causing sidemapping to be performed immediately after the backfilling for a presently mapped image pixel is completed.

29. The method of claim 1, further comprising:

associating the geographic information with image pixels of the location in said first association includes mapping the geocode values to the image pixels using a projection coordinate transform.

30. The method of claim 29, further comprising:

mapping each said geocode value to a column and row location in the image pixel array using a projection coordinate transform.

31. The method of claim 30, further comprising:

mapping each said geocode value by projecting its geographic longitude, latitude and elevation coordinates to the column and row coordinates of an image pixel in the two dimensional array of image pixels.

32. The method of claim 1, further comprising:

obtaining latitude and longitude information, altitude information, compass heading information, and pitch and yaw information for the image sensor as the image sensor senses the location; and using the information to obtain the geographic information for the location.

33. A method of spatially encoding an image of a location, the method comprising:

directing an image sensor toward a location so that the image sensor senses the location;

producing a sensed image using the image sensor in a two dimensional array of image pixels of the location sensed by the image sensor;

obtaining spatial coordinate information in a two dimensional first array of spatial codes for the location sensed by the sensor, the spatial coordinate information including X, Y and Z coordinate data for each one of the spatial codes forming the two dimensional first array of spatial codes; and processing the spatial codes of the two dimensional first array of spatial codes with the image pixels of the location to associate geographic information of the spatial codes with each of the pixels, by:

orienting the two dimensional first array of spatial codes relative to a line of sight of the image sensor; and processing the spatial codes so as to rotate the spatial codes to achieve a desired alignment of the spatial codes relative to the image sensor line of sight.

34. The method of claim 33, further comprising:

the two dimensional first array of spatial codes including spatial codes describing a shape of a surface sensed at the location;

wherein the X, Y and Z coordinate data for each said spatial code comprises coordinate data for three mutually orthogonal X, Y, Z coordinate axes, describing a three dimensional position of a point on the sensed surface in the sensed location; and wherein the spatial codes include a combination of X, Y, and Z coordinate numerical values and row and column indices of the spatial code location in the two dimensional spatial code array.

35. The method of claim 34, further comprising:

orienting the two dimensional first array of spatial codes so that an orientation of the two dimensional first array of spatial codes corresponds to an orientation of the image sensor relative to the location;

a center column of spatial codes in the two dimensional first array of spatial codes having spatial X, Y coordinates that align with a direction line from the sensor to the spatial X, Y location of the location sensed by the sensor; and the bottom row of the two dimensional first array of spatial codes of spatial coordinates is closest in spatial distance to the spatial location of the sensor.

36. The method of claim 35, further comprising:

the two dimensional array of image pixels having rows and columns of image pixels;

the two dimensional first array of spatial codes having rows and columns of spatial codes; and associating the spatial codes of the two dimensional first array of spatial codes in a first association with the image pixels of the location by mapping each spatial code to an image pixel from a bottom row of spatial codes upwardly through successive rows of spatial codes to a top row of spatial codes.

37. The method of claim 36, further comprising:

associating the spatial codes of the two dimensional first array of spatial codes in said first association includes associating the X, Y, Z spatial coordinate triple of the spatial code to a column and row location index pair of an image pixel in the image pixel array.

38. The method of claim 36, further comprising:
mapping each spatial code to an image pixel including a two dimensional second array of image spatial codes associated in a second association with the two dimensional array of image pixels;
the second array of image spatial codes having the same numbers of rows and columns of spatial codes as the array of image pixels has rows and columns of image pixels; and
each image pixel being associated in said second association with exactly one spatial code in the second array of spatial codes, said second association being that both have the same row and column location in their respective arrays.

39. The method of claim 38, further comprising:
mapping each spatial code to an image pixel including the spatial code being recorded as an image spatial code value in the second array of image spatial codes at the column and row location of the image pixel mapped by the spatial code; and
backfill and sidemapping of unmapped and unfilled image spatial codes is done for each spatial code mapped to an image pixel.

40. The method of claim 36, further comprising:
mapping the spatial codes to the image pixels in said first association using a projection coordinate transform.

41. The method of claim 33, further comprising:
associating the spatial codes of the two dimensional first array of spatial codes with the image pixels includes associating each X, Y, Z spatial coordinate triple of a spatial code in the two dimensional spatial code array with an image pixel.

42. A method of spatially encoding an image of a location, the method comprising:
directing an image sensor toward a location so that the image sensor senses the location;
producing a sensed image using the image sensor in a two dimensional array of image pixels of the location sensed by the image sensor;
obtaining spatial coordinate information in a two dimensional first array of spatial codes for the location sensed by the sensor, the spatial coordinate information including X, Y and Z coordinate data for each one of the spatial codes forming the two dimensional first array of spatial codes; and
associating the spatial codes of the first array of spatial codes with the image pixels of the location in part by rotating the spatial codes to achieve a desired alignment of the spatial codes relative to the image sensor line of sight.

* * * * *